United States Patent [19]

Spokas

[11] 4,086,995
[45] May 2, 1978

[54] FRICTION CLUTCHES

[75] Inventor: Romas B. Spokas, Rockford, Ill.

[73] Assignee: Borg-Warner Corporation, Chicago, Ill.

[21] Appl. No.: 722,950

[22] Filed: Sep. 13, 1976

[51] Int. Cl.$^2$ .................... F16D 11/00; F16D 13/00; F16D 19/00

[52] U.S. Cl. ................. 192/111 B; 192/70.25; 192/70.28; 192/99 A; 192/89 B

[58] Field of Search ............... 192/70.28, 89 B, 111 B, 192/70.25, 99 A, 114 R

[56] References Cited

U.S. PATENT DOCUMENTS

| | | | |
|---|---|---|---|
| 482,491 | 9/1892 | Weber | 192/111 B X |
| 1,665,999 | 4/1928 | Byerlein | 192/111 B X |
| 1,983,885 | 12/1934 | Spase | 192/70.28 X |
| 2,129,361 | 9/1938 | Ruesenberg et al. | 192/111 B X |
| 2,192,301 | 3/1940 | Eason | 192/111 X |
| 2,229,910 | 1/1941 | Adamson et al. | 192/111 B X |
| 2,758,691 | 8/1956 | Palm | 192/111 B |
| 3,176,814 | 4/1965 | Sink | 192/111 B |
| 3,241,643 | 3/1966 | Montgomery | 192/98 X |
| 3,754,628 | 8/1973 | Hildebrand | 192/111 B |

*Primary Examiner*—William F. O'Dea
*Assistant Examiner*—Larry Jones
*Attorney, Agent, or Firm*—Herman E. Smith

[57] ABSTRACT

An improved arrangement of locking apparatus for securing the fulcrum ring of a clutch in adjusted position includes a rotatable cam operable from a readily accessible location for forcing a locking bar radially into engagement with a slotted fulcrum ring; a wedge shaped nose on the locking bar is preferred for taking up clearance between the bar and slot in order to eliminate hammering or chucking; the nose of the locking bar may have compound inclination for exerting wedging action both radially and parallel to the axis; the wedging and securing of the locking bar is facilitated by the provision of coaxial hexagonal drive lugs adapted for engagement by wrenches. In addition, an improved interlocking drive connection is provided between the finger of a belleville spring and a release sleeve assuring that the sleeve rotates with the spring.

4 Claims, 9 Drawing Figures

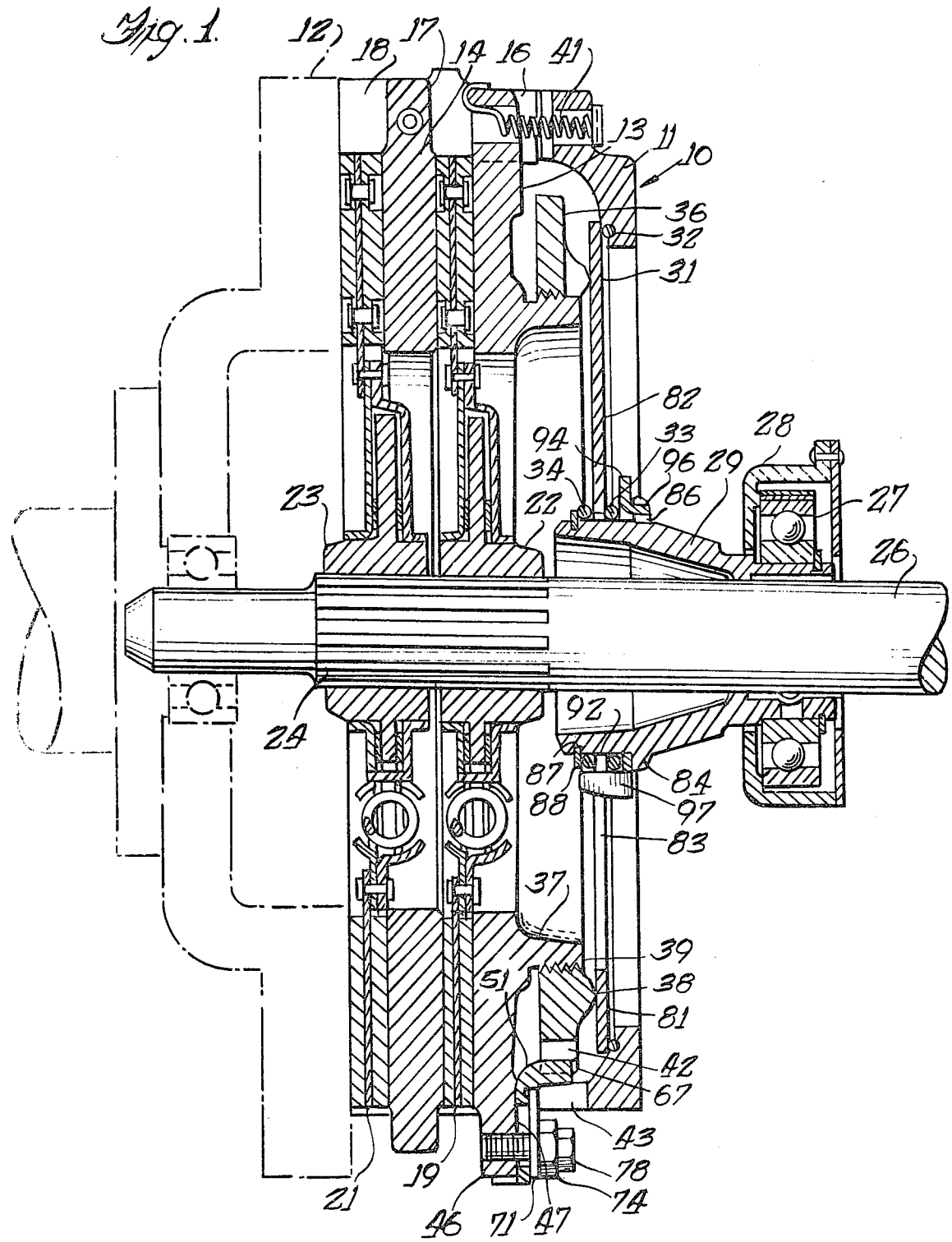

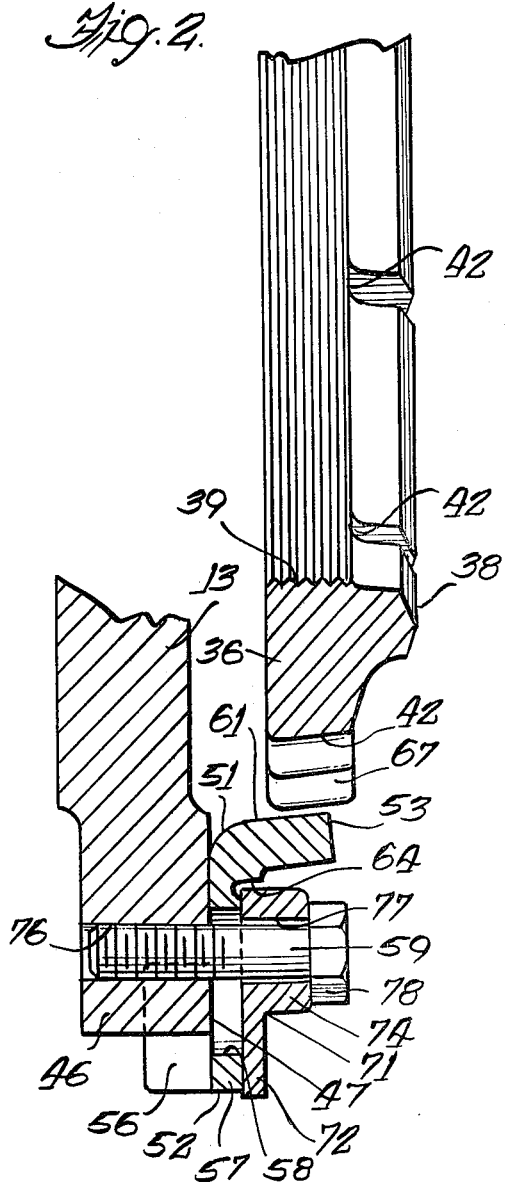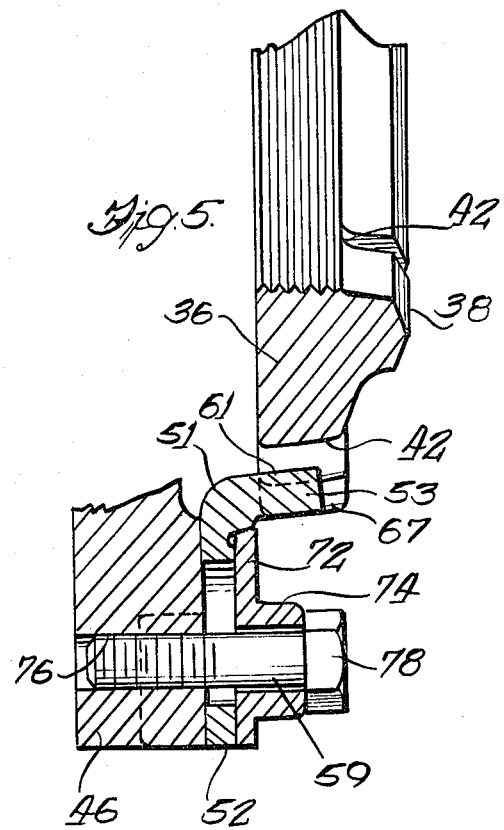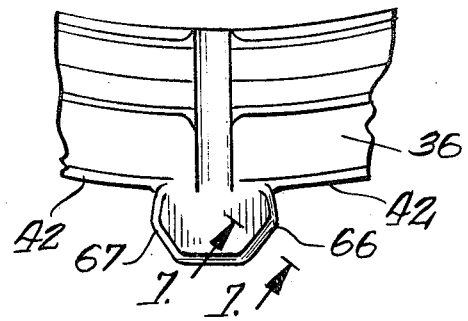

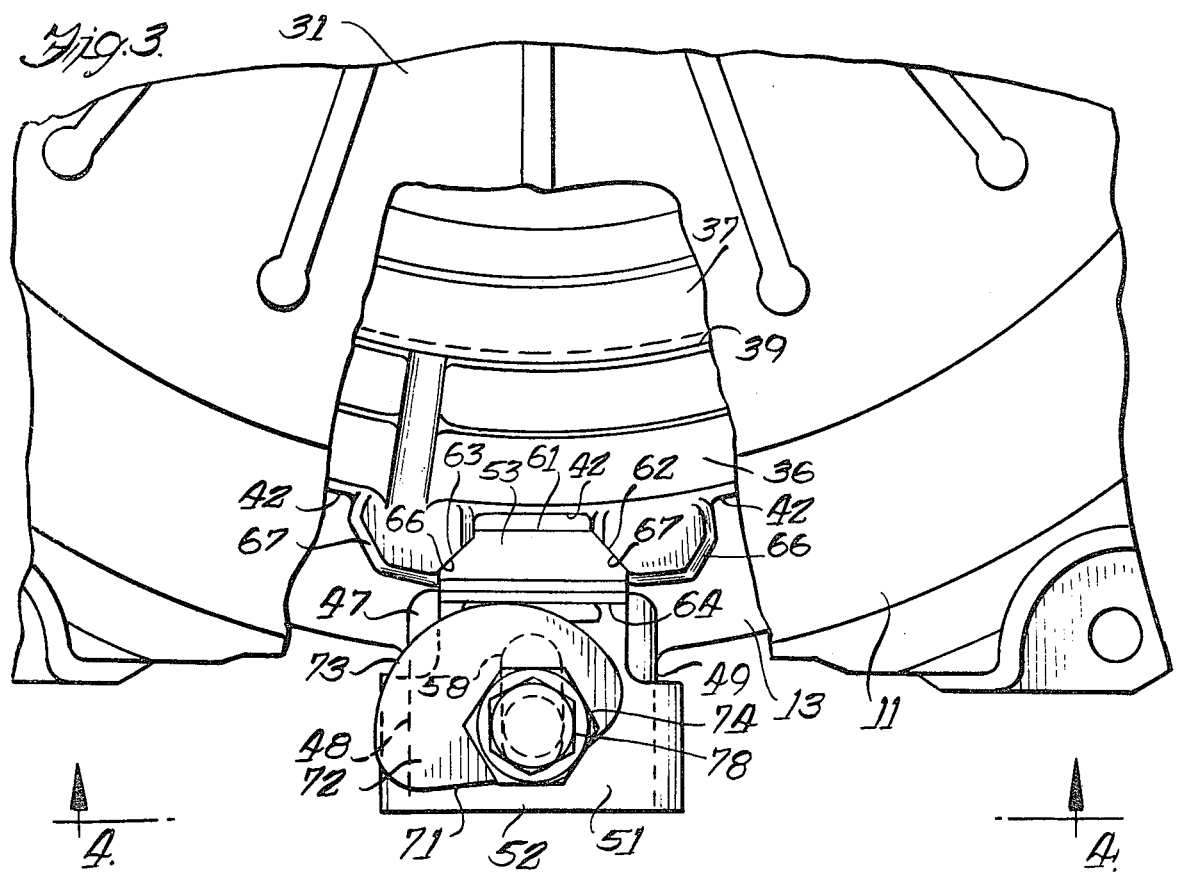
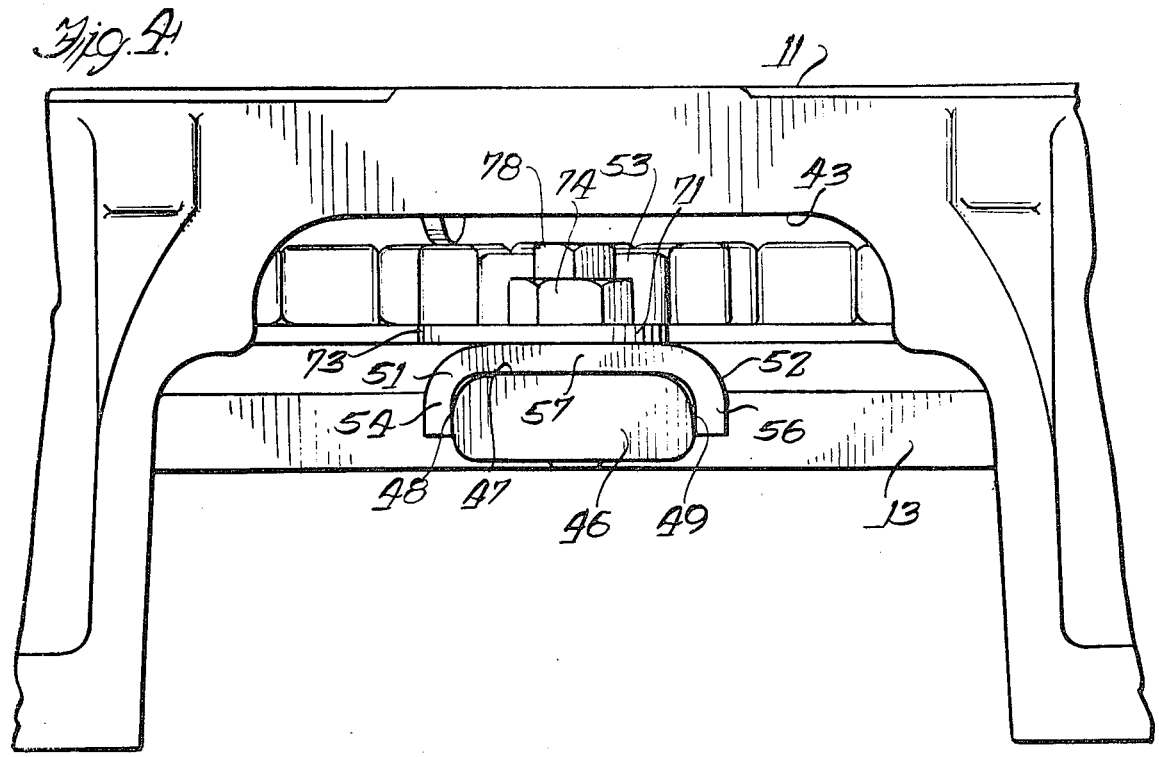

FRICTION CLUTCHES

BACKGROUND OF THE INVENTION

1. Field.

The present invention relates generally to friction clutches and more particularly to improved locking apparatus for securing the fulcrum ring in a selected position of adjustment. In addition the invention includes a positive interlocking drive between a belleville engaging spring and a release sleeve.

2. Prior Art.

In friction clutches, it is known to provide a rotatably adjustable fulcrum ring which is usually mounted on a threaded portion of either a rotatable housing or rotatable pressure plate such that rotation of the fulcrum ring relative to the threaded portion results in axial movement of the fulcrum. As the clutch undergoes changes in rotational speed, the mass of the fulcrum ring tends to cause rotation of the ring relative to the pressure plate and housing which would in turn bring about a change in clutch adjustment unless restrained. The prior art includes various examples of locking devices for the purpose of securing the fulcrum ring in a selected position of adjustment with respect to the pressure plate and housing. Such prior locking devices ordinarily include a tongue like portion which is inserted in a slot portion of the fulcrum ring to prevent rotation of the ring relative to the pressure plate and housing. If dimensional clearance is provided between the tongue and slot, changes in rotary inertia of the ring causes the walls of the slot to hammer on the edges of the tongue which results in undesirable noise, sometimes referred to as "chucking", and may result in destruction of the locking member. On the other hand, if dimensional clearance is not provided between the slot and tongue, it becomes exceeding difficult to reinstall the locking devices after the clutch is installed in a vehicle and readjustment of the clutch has become necessary. It is desirable, therefore, to provide additional improvements in locking devices for the fulcrum ring of a clutch. The present invention is directed to improved locking apparatus for an adjustable fulcrum ring in a friction clutch.

A further problem encountered with clutches according to the prior art arises from relative rotation between a release sleeve and portions of the clutch apply apparatus. Such relative rotation results in wear which when multiplied through the mechanical advantage provided by the operating apparatus results in a significant loss of effective pedal travel.

SUMMARY OF THE INVENTION

The present invention provides improved locking apparatus for securing a fulcrum ring in a selected position of adjustment, which overcomes the problem of hammering or "chucking" and is easily installable in relatively confined quarters such as may occur in a vehicle. More particularly, the improved locking apparatus includes a rotatable cam arranged for urging a nose portion of a locking bar into tight engagement with a corresponding slotted portion of a fulcrum ring. For convenience, the cam is arranged for rotation by means of a wrench, the axis of rotation of the cam coinciding with the axis of a securing screw. Additionally, the improved locking apparatus may include a nose portion having convergingly oriented surfaces providing for readily engageable and disengageable wedging action between the locking bar and fulcrum ring.

In addition, the present invention provides a positive interlocking drive connection between the fingers of a belleville spring and a release sleeve such that relative rotation of the sleeve with respect to the fingers of the spring is prevented, thus avoiding a source of wear which could significantly affect pedal travel.

BRIEF DESCRIPTION OF THE DRAWINGS

FIG. 1 is a section view of a clutch showing the locking apparatus and release sleeve drive connection according to the present invention;

FIG. 2, is an enlarged fragmentary view similar to FIG. 1 showing the locking apparatus disengaged from the fulcrum ring;

FIG. 3 is an enlarged fragmentary elevation view of the locking apparatus;

FIG. 4 is an enlarged fragmentary end view of the locking apparatus taken along the line 4—4 of FIG. 3.

FIG. 5 is an enlarged fragmentary view comparable to FIG. 2, but showing the locking apparatus engaged with the fulcrum ring;

FIG. 6 is an enlarged fragmentary view of a portion of the fulcrum ring showing details of the slot wall;

FIG. 7 is a fragmentary section view taken along the line 7—7 of FIG. 6;

DESCRIPTION OF THE PREFERRED EMBODIMENT

Figure 8:
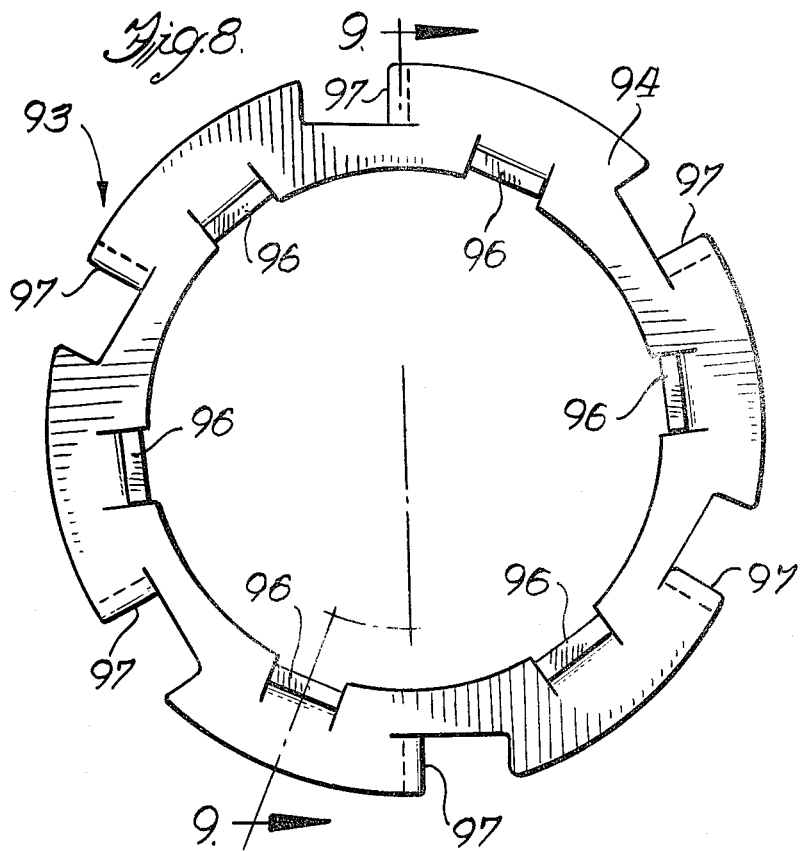
FIG. 8 is an elevation view of a drive ring.

Referring now in more detail to the drawings, a friction clutch 10 is shown in section in FIG. 1. The illustrated clutch is a heavy duty clutch including a rotatable housing 11 adapted for connection to a flywheel 12 of an engine. A pressure plate 13 and an intermediate plate 14 are disposed within housing 11 and have respective radial extensions 16, 17 engaged within a slotted portion 18 of the housing arranged for rotating the pressure plate and intermediate plate with the housing while permitting axial movement of the plates relative to the housing. Clutch 11 includes a pair of friction plates 19, 21, friction plate 19 being disposed between pressure plate 13 and intermediate plate 14 while friction plate 21 is disposed between intermediate plate 14 and flywheel 12. Friction plates 19, 21 include hub portions 22, 23 mounted on a splined portion 24 of output shaft 26.

A throw out bearing 27 is arranged concentrically about output shaft 26 and has its outer race secured to a nonrotatable portion 28 of an operating mechanism such as a yoke (not shown in the drawing). The inner race of bearing 27 is secured to a rotatable sleeve which is mounted to permit axial translation with respect to output shaft 26.

A belleville spring 31 engages a ring 32 in housing 11 adjacent its outer edge while the inner edge is trapped between a pair of rings 33, 34 secured to sleeve 29.

A rotatably adjustable fulcrum ring 36 is rotatably mounted on a threaded extension portion 37 of pressure plate 13. Fulcrum ring 36 is provided with a raised ridge portion 38 extending annularly about the ring, engaging belleville spring 31. The outer perimeter of fulcrum ring 36 includes an annular series of notches or slots 42 providing means for rotating the fulcrum ring with respect to the pressure plate and providing means for engagement of locking apparatus for securing the fulcrum ring in a selected position of rotation with respect to the pressure plate. Rotation of fulcrum ring 36 with respect to pressure plate 13 results in axial translation of ridge portion 38 with respect to the plane of rotation of the pressure plate due to movement on the threads 39 of threaded portion 37.

When clutch 10 is engaged, belleville spring 31 acts between ring 32 and ridge 38 to impose an engagement load on the pressure plate 13, friction plate 19, intermediate plate 14, friction plate 21 and flywheel 12 by which the members are clamped in frictional torque transfer relationship for transmitting rotation from flywheel 12 to output shaft 26.

When clutch 10 is released, sleeve 29 is moved toward the right as viewed in FIG. 1 such that belleville spring 31 is moved from load imposing engagement with ridge 38 permitting separator spring 41 to pull pressure plate 13 from friction plate 19. Separation of friction plates 19 and 21 from the flywheel and respective intermediate and pressure plates permits relative rotation between the flywheel 12 and output shaft 26.

As wear occurs on the surfaces of friction plates 19, 21, it is desirable to adjust fulcrum ring 36 in order to reestablish a desired axial relationship between the location of ridge 38 with respect to ring 32 to the end that the engagement load provided by belleville spring 31 remains within a selected range.

In order to facilitate adjustment of fulcrum ring 36 with respect to pressure plate 13, an opening 43 is provided in housing 11 affording access to the series of slots 42. A suitable tool such as a pry bar may be inserted through the opening 43 for engaging the slots 42 in the fulcrum ring. When the fulcrum ring 36 has been rotated to a desired position of adjustment, it is secured in the selected position by locking apparatus.

An improved construction of locking apparatus is shown in the drawings and is described hereinafter in more detail.

The pressure plate 13 includes a radial extension 46 having a face 47 and a pair of side surfaces 48, 49 providing means for guiding and securing a locking bar 51 with respect to the pressure plate. The locking bar 51 includes a channel shaped portion 52 having spaced legs 54, 56 extending from a base portion 57 arranged for embracing the radial extension 46. Base portion 57 includes an elongated slot 58 adapted to permit passage of a cap screw 59 and to permit radial movement of the locking bar 51 with respect to radial extension 46. A nose portion 53 extends from base portion 57 and includes an inclined front surface 61 merging with a pair of spaced inclined side surfaces 62, 63. The side surfaces 62, 63 are inclined in a direction parallel to the axis of rotation of the clutch and in a radial direction with respect to the axis of rotation of the clutch. The side surfaces 62, 63 are thus convergently oriented somewhat in the manner of a truncated pyramid, and are capable of exerting wedging action radially inwardly as well as axially parallel with respect to the plane of rotation of the fulcrum ring.

Nose portion 53 also includes a substantially flat bearing surface 64 spaced from front surface 61 and extending outwardly from base portion 57. A rotatable cam 71 includes a plate like portion 72 having a force multiplying camming surface 73 defined along an edge thereof and including a rotary drive lug 74 extending outwardly therefrom. Preferably, the drive lug 74 is provided with hexagonally oriented flat sides of a size selected for engagement with a wrench, by which means the cam 71 can be rotated for urging the camming surface 73 against bearing surface 64. Rotation of cam 71 thus exerts a radially inward thrust on locking bar 51 urging nose portion 53 thereof into tight engagement with portions of a slot 42. If desired, the slots 42 may be formed with surfaces 66, 67 having a compound inclination with respect to the plane of rotation of the fulcrum ring. Where a slot is provided with side walls having compound inclination, a portion of the slot is complemental to the truncated pyramidal shape of the nose portion.

A securing means such as a cap screw 59 is received in a threaded opening 76 in radial extension 46 extending through an aperture 77 in cam member 71 and through slot 58 in locking bar 51. The cap screw 59 includes a hexagonal head 78 providing a second drive lug coaxially oriented with respect to drive lug 74 on cam 71.

As suggested in FIG. 2, the cap screw 59 can be loosened and the cam rotated to a position such that the nose portion 53 of locking bar 51 can be withdrawn from slot 42 of the fulcrum ring 36. After withdrawing locking bar 51 from the slot, the fulcrum ring can be rotated on threaded portion 37 to provide a desired position of ridge 38.

When the fulcrum ring 36 has been rotated to its desired position of adjustment, the nose portion 53 of locking bar 51 is reengaged with a slot 42 in the fulcrum ring. In order to secure the nose portion 53 in a slot 42, a pair of wrenches is employed, for simultaneously gripping drive lugs 74 and 78. Rotation of drive lug 74 and cam 71 drives locking bar 51 radially inwardly such that the nose portion 53 is wedged into a slot 42, after which drive lug or head 78 of cap screw 59 is turned to secure the locking bar in place on radial extension 46. The apparatus thus provides a readily accessible means for forcing a locking bar radially into engagement with a slot in a fulcrum ring. Providing radially convergent inclined side walls on the nose portion results in a wedging action with the slot which is readily disengageable when readjustment is desired. Where the side walls 62, 63 have compound inclination, a double wedging action is achieved, first in a radial direction by rotation of the cam, and second parallel to the axis of tightening the cap screw. The wedging engagement of the nose portion of the locking bar with a slot in the fulcrum ring assures that any clearance space is taken up such that no back lash is present which could result in "chucking". It is desirable to eliminate hammering or "chucking" of the slot on the locking bar both to eliminate a source of noise and a source of destructive fatigue stress.

A further aspect of the invention resides in the provision of a positive interlocking drive connection between the belleville spring 31 and release sleeve 29. The belleville spring 31 includes an outer portion 81 which acts between the housing and fulcrum ring in the manner of a diaphragm spring and also includes radially inwardly extending finger portions indicated by reference character 82, adjacent finger portions defining a series of circumferential spaces one of which is indicated by reference character 83. Finger portions 82 act in the manner of levers for controlling engagement of outer portion 81 with fulcrum ring 36.

Release sleeve 29 includes an annular abutment portion 84 which is interrupted by one or more key slots 86. A snap-ring groove 87 is spaced axially from abutment portion 84 arranged for receiving a snap-ring 88. A pair of annular wire like pivot ring members 34, 33 embrace a cylindrical portion 92 of the sleeve 29 and respectively engage opposite sides of the belleville spring fingers 82. The wire like pivot members are of circular cross section providing rocking pivots for the inner ends of the belleville fingers.

If relative rotation were permitted between the fingers of the belleville spring and the wire-like pivot rings, flat spots would become worn on the pivot rings. Such flat spots would destroy the curved pivot surfaces engaged by the spring fingers and also result in axial clearance between the fingers and pivot rings. The axial clearance resulting from wear would be multiplied through the clutch operating apparatus and result in a significant loss of effective pedal travel.

Figure 9:
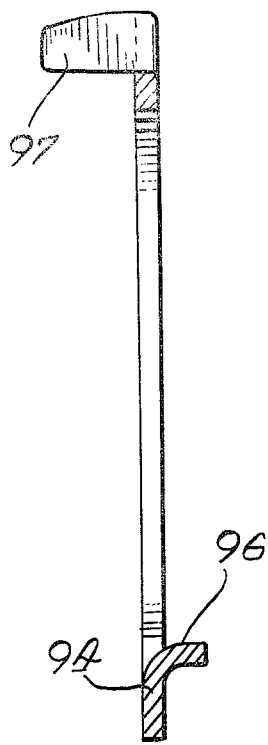
FIG. 9 is a section view of the drive ring taken along the line 9—9 of FIG. 8.

Referring to FIGS. 1, 8 and 9 a drive ring 93 is provided for preventing relative rotation between the fingers of the belleville spring and the release sleeve. Drive ring 93 includes an annular flange portion 94 having a circumferential series of tang portions 96 extending axially therefrom. In the embodiment of FIG. 1 the tang portions 96 engage corresponding key slots 86 in sleeve 29. If desired, the annular flange portion 94 can be secured to sleeve 29 by other means such as screws, rivets or welding in which case the tang portions 96 can be eliminated. Annular flange portion 94 also includes a circumferential series of axially and radially extending second tang portions 97 which extend between an adjacent pair of spring fingers of belleville spring 31. As belleville spring 31 rotates with housing 11, finger portions 82 bear against second tang portions 97, thereby rotating flange portion 94 which in turn imparts rotation to sleeve 29. The positive interlocking connection between the belleville spring and sleeve provided by drive ring 93 assures that no relative rotation can occur between the spring fingers and pivot rings.

In the foregoing description, an improved locking apparatus for a fulcrum ring has been described which is readily engageable with and disengageable from the fulcrum ring, which eliminates hammering or "chucking" and which is readily accessible when readjustment becomes necessary. In addition, a positive interlocking ring has been described which prevents relative rotation between the fingers of a belleville spring and a release sleeve.

What is claimed is:

1. In a friction clutch including concentrically disposed housing and pressure plate members and having a rotatably adjustable fulcrum ring mounted on one of said members, improved locking apparatus for retaining said fulcrum ring in a selected position of adjustment with respect to said one member, said apparatus including a slidable locking bar mounted on said one member arranged for radial movement toward and from said fulcrum ring, said locking bar including a nose portion engageable with a complementary slotted portion of said fulcrum ring, a rotatable cam member mounted on said one member having a camming surface engaging said locking bar arranged for urging said locking bar toward said fulcrum ring in response to rotation of said cam, and securing means mounted on said one member effective for securing said cam member and locking bar with respect to said one member.

2. Improved locking apparatus according to claim 1, wherein said nose portion of said locking bar includes a pair of surfaces inclined with respect to each other arranged for wedging engagement with wall portions of said complementary slotted portion of said fulcrum ring.

3. Improved locking apparatus according to claim 2, wherein at least one surface of said pair of surfaces on said nose portion is inclined axially with respect to the plane of rotation of said rotatable fulcrum ring.

4. Improved locking apparatus according to claim 1, wherein said cam member includes a first rotary drive lug and said securing means includes a second rotary drive lug coaxial with said first drive lug and rotatable independently of said cam.

* * * * *